United States Patent
Phillips et al.

[11] Patent Number: 5,932,708
[45] Date of Patent: Aug. 3, 1999

[54] REACTIVE AZO DYES HAVING A PERMANENT QUATERNARY AMMONIUM GROUP AND A FIBER-REACTIVE GROUP

[75] Inventors: Thomas S. Phillips, North Providence; Ralph Svenningsen, Coventry, both of R.I.; Ronald P. Pedemonte, Eppstein-Vockenhausen, Germany

[73] Assignee: Dystar, L.P., Charlotte, N.C.

[21] Appl. No.: 09/071,391

[22] Filed: May 1, 1998

Related U.S. Application Data

[63] Continuation-in-part of application No. 08/822,635, Mar. 25, 1997, abandoned.

[51] Int. Cl.$^6$ .......................... C09B 62/006; C09B 62/09; C09B 62/507
[52] U.S. Cl. .......................... 534/603; 534/604; 534/614
[58] Field of Search ...................... 534/603, 604, 534/614

[56] References Cited

U.S. PATENT DOCUMENTS

| | | | |
|---|---|---|---|
| 3,338,660 | 8/1967 | Biedermann et al. | 8/54 |
| 4,333,874 | 6/1982 | Nickel et al. | 534/604 |
| 4,820,806 | 4/1989 | Baumann et al. | 534/605 |
| 4,865,990 | 9/1989 | Stead et al. | 435/803 |
| 5,019,165 | 5/1991 | Bruder et al. | 106/22 |
| 5,112,970 | 5/1992 | Büch et al. | 544/75 |

FOREIGN PATENT DOCUMENTS

| | | |
|---|---|---|
| 516298 | 12/1992 | European Pat. Off. . |
| 1-156582 | 6/1989 | Japan . |

*Primary Examiner*—Fiona T. Powers
*Attorney, Agent, or Firm*—Connolly & Hutz

[57] ABSTRACT

Fiber-reactive monoazo and disazo dyes, suitable for dyeing cellulose material, such as cotton, and also synthetic or natural polyamide material, such as wool, in high color depth and with good fastness properties, are described which contain a quaternary ammonium group, such as a trialkylammonium group, and contain, as a fiber-reactive group, a group of the vinyl-sulfone series, or a grouping containing a group of the vinyl-sulfone series, or a heterocyclic fiber-reactive group selected from a halogeno-substituted pyrimidine or triazine.

12 Claims, No Drawings

REACTIVE AZO DYES HAVING A PERMANENT QUATERNARY AMMONIUM GROUP AND A FIBER-REACTIVE GROUP

This is a continuation-in-part application of U.S. patent application Ser. No. 08/822,635 filed Mar. 25, 1997, now abandoned, which is incorporated by reference in its entirety for all purposes.

This invention is drawn to a reactive azo dye containing a permanent quaternary ammonium group as a substituent of the dye which facilitates use in low and no salt dye baths.

Fiber reactive dyes form a chemical bond with the fiber being colored, and are generally considered to possess excellent fastness properties. The largest class of fiber reactive dyes are azo dyes which contain one or more azo groups. Fiber reactive azo dyes are generally prepared by the chemical reaction between a diazo component and a coupling component, referred to as a coupling reaction. In general, a coupling compound contains an aromatic hydroxy group or an activated methylene group or an aromatic amine or a combination of two or more of these groups. Fiber reactive dyes contain one or more groups which, in the dyeing process, leave the dye molecule creating a reactive site, so that the dye can bond with the substrate which is being dyed. The group which leaves the dye during the dyeing process is called a leaving group. Thus, a leaving group is defined as a moiety that leaves the dye molecule during the dyeing process, creating a reactive site.

Today, not only the quality of dyed product, but also the efficiency and environmental impact of the dyeing process have come under scrutiny. Competitive and environmental concerns have lead to more stringent requirements being imposed on the use of reactive dyestuffs. A measure of the intensity of a color is the color density unit (CDU). With fiber reactive dyes, it has been possible to increase the intensity of the color obtained by a dyebath by addition of salt. However, the use of salt increases the cost of the dyebath, and increases the toxicity of the dyebath. Discharge from a spent salt-containing dyebath has the potential to harm beneficial bacteria in rivers and lakes. Therefore, the search continues for a new fiber reactive dye which possess good color fastness, good color yield, and are environmentally advantageous in that they may be used with low or no salt dyebaths.

With the present invention, fiber reactive azo dyes have been found which have a quaternary ammonium group as a permanent substituent and a fiber reactive group, these azo dyes according to the instant invention being selected from the dyes of the general formulae (1a), (1b) and (1c)

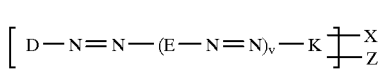
(1a)

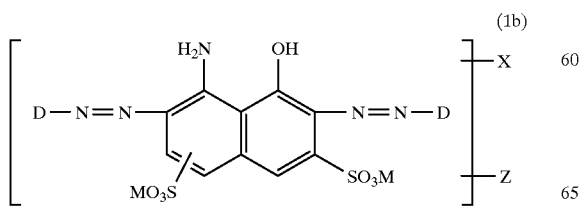
(1b)

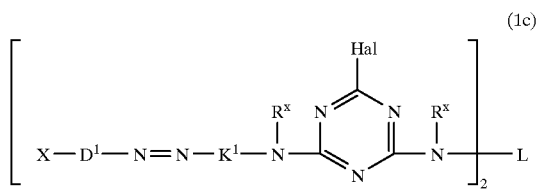
(1c)

in which:

X is a grouping containing a quaternary ammonium group

Z is a fiber reactive group selected from the groups of the formulae (2a), (2b), (2c), (2d), (2e), (2f), (2g) and (2h)

(2a)

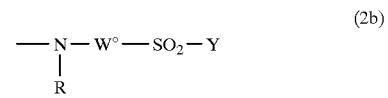
(2b)

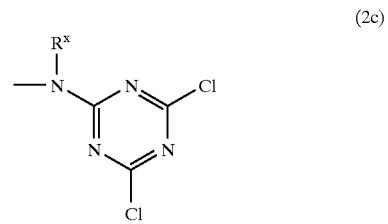
(2c)

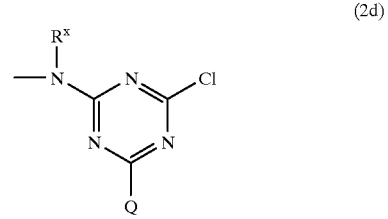
(2d)

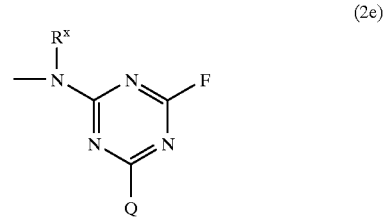
(2e)

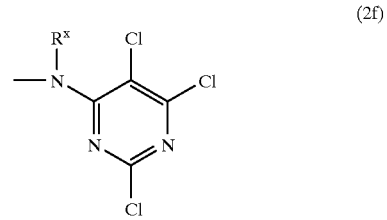
(2f)

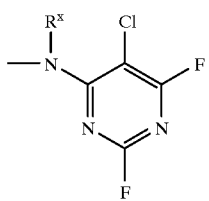
(2g)

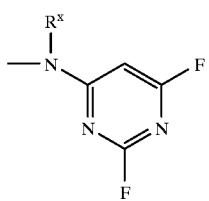
(2h)

Y is vinyl, or is ethyl substituted in the β-position by a substituent which is eliminated by the action of an alkaline agent, such as halogen, for example, chlorine or bromine, sulfato, thiosulfato, phosphate, alkanoyloxy of 2 to 5 carbon atoms, such as acetyloxy, benzoyloxy, sulfobenzoyloxy or p-toluene sulfonyloxy, preferably sulfato and chlorine, R is alkyl of 1 to 4 carbon atoms, such as methyl or ethyl, or is hydrogen, $W°$ is alkylene of 2 to 4 carbon atoms, in particular ethylene and n-propylene, or is a covalent bond, $R^x$ is hydrogen, alkyl of 1 to 4 carbon atoms, unsubstituted or substituted by halogen, such as chlorine, hydroxy, sulfo, sulfato, carboxy, sulfamoyl, alkoxycarbonyl of 2 to 5 carbon atoms or alkoxy of 1 to 4 carbon atoms, and Q is cyanoamido, hydroxy, alkoxy of 1 to 4 carbon atoms, phenoxy, sulfophenoxy, pyridino, carboxypyridino, carbamoylpyridino or a group of the general formula (3a), (3b), (3c)

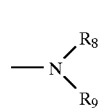
(3a)

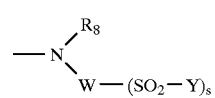
(3b)

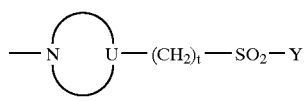
(3c)

in which $R_8$ is hydrogen, alkyl of 1 to 4 carbon atoms, cyclohexyl, alkoxy of 1 to 4 carbon atoms, hydroxyalkyl of 2 to 4 carbon atoms, sulfoalkyl of 1 to 4 carbon atoms, phenyl unsubstituted or substituted by 1 to 2 substituents selected from the group of substituents consisting of chlorine, bromine, methyl, ethyl, methoxy, sulfo and carboxy, or is monosulfonaphthyl, disulfonaphthyl, alkyl of 2 to 6 carbon atoms substituted by phenyl, the alkyl moiety may be interrupted by a hetero group selected from O, S, NH, $SO_2$, CO, CO—NH or NH—CO, and the phenyl substituent thereof may be substituted by 1 or 2 substituents selected from the group consisting of chlorine, bromine, methyl, ethyl, methoxy, ethoxy, sulfo and carboxy, $R_9$ has one of the meanings given for $R_8$, W is arylene, alkylene or alkylene-arylene, each unsubstituted or substituted, wherein the alkylene moieties being preferably those of 1 to 6 carbon atoms, preferably of 1 to 4 carbon atoms, in particular of 1 to 3 carbon atoms, such as methylene, ethylene and n-propylene, or being preferably of 2 to 6 carbon atoms, if interrupted by a hetero group, such as O, S, NH, $SO_2$, CO, CO—NH or NH—CO, arylene being preferably phenylene or naphthylene, the substituents of phenylene being preferably 1 or 2 substituents selected from the group consisting of alkyl of 1 to 4 carbon atoms, such as methyl and ethyl, alkoxy of 1 to 4 carbon atoms, such as methoxy and ethoxy, carboxy, sulfo and chlorine, in particular thereof methyl, ethyl, methoxy and ethoxy, and the substituents of naphthylene being preferably 1 or 2 sulfo groups, Y is defined as above, s is the number 1 or 2, t is the number 1, 2 or 3, and U is N or CH, and U forms together with the N-atom a bivalent ring consisting of 1 or 2 alkyl groups having 1 to 5 carbon atoms and optionally additionally 1 or 2 hetero groups, such as O or NH;

X being bonded to D and Z being bonded to K, respectively X being bonded to K and Z being bonded to D in formula (1a), and X is bonded to one of the two D's and Z is bonded to the other D in formula (1b);

D if substituted by X, has the meaning of $D^1$ defined below;

D if substituted by Z, is phenylene unsubstituted or substituted by 1 or 2 substituents selected from alkyl of 1 to 4 carbon atoms, such as methyl and ethyl, alkoxy of 1 to 4 carbon atoms, such as methoxy and ethoxy, and sulfo, preferably by 1 or 2 sulfo groups or by 1 methyl group, or is naphthylene, substituted by 1 or 2 sulfo groups;

$D^1$ is phenylene unsubstituted or substituted by 1 or 2 substituents selected from alkyl of 1 to 4 carbon atoms, such as methyl and ethyl, alkoxy of 1 to 4 carbon atoms, such as methoxy and ethoxy, alkanoyl of 2 to 5 carbon atoms, such as acetyl and propionyl, cyano, sulfo, carboxy, alkoxycarbonyl of 2 to 5 carbon atoms, such as methoxycarbonyl and ethoxycarbonyl, carbamoyl, N—($C_1$–$C_4$-alkyl)-carbamoyl, fluorine, chlorine, bromine, trifluoromethyl, nitro, sulfamoyl, N—($C_1$–$C_4$-alkyl)-sulfamoyl, sulfophenylamidocarbonyl, phenylamidocarbonyl, alkylksulfonyl of 1 to 4 carbon atoms, phenylsulfonyl, phenoxy and hydroxy, or is naphthylene unsubstituted or substituted by 1 or 2 sulfo groups;

E is a group of the general formula (7a), (7b) or (7c)

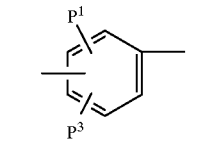
(7a)

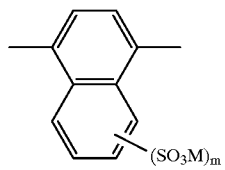
(7b)

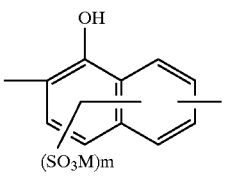
(7c)

in which

M is defined as above, m is zero, 1 or 2 (and if m is zero, this group is a hydrogen), $P^1$ is hydrogen, methyl, ethyl, methoxy, ethoxy, alkanoyl of 2 to 5 carbon atoms, such as acetyl and propionyl, cyano, sulfo, carboxy, alkoxycarbonyl of 2 to 5 carbon atoms, such as methoxycarbonyl and ethoxycarbonyl, carbamoyl, N—($C_1$–$C_4$-alkyl)-carbamoyl, fluorine, chlorine, bromine or trifluoromethyl, preferably hydrogen, methyl, methoxy, bromine, chlorine, sulfo and carboxy, and $P^3$ is hydrogen, alkyl of 1 to 4 C atoms, such as methyl or ethyl, alkoxy of 1 to 4 C atoms, such as methoxy and ethoxy, chlorine, alkanoylamino of 2 to 5 C atoms, such as acetylamino and propionylamino, benzoylamino, ureido, phenylureido, alkylureido having 1 to 4 C atoms in the alkyl radical, phenylsulfonyl or alkylsulfonyl of 1 to 4 C atoms;

—K—Z is a group of the general formula (9a), (9b), (9c), (9d), (9e), (9f), (9g) or (9h)

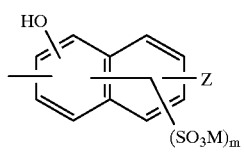
(9a)

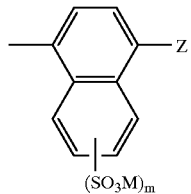
(9b)

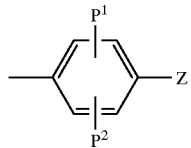
(9c)

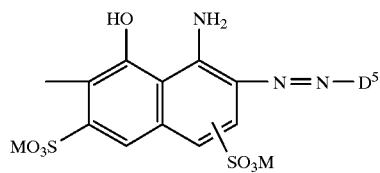
(9d)

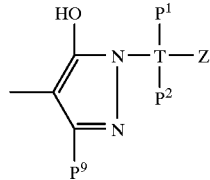
(9e)

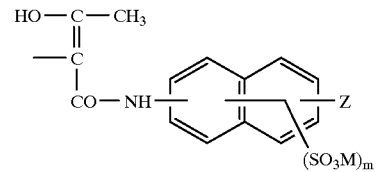
(9f)

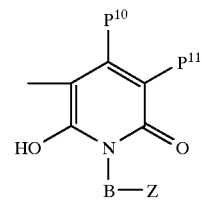
(9g)

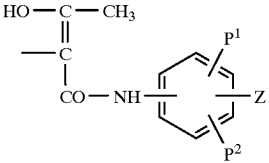
(9h)

in which

Z, M, m and $P^1$ are defined as above, $P^2$ is hydrogen, methyl, ethyl, methoxy, ethoxy, cyano, nitro, carboxy, sulfo, chlorine, alkanoylamino of 2 to 5 C atoms, such as acetylamino, alkoxycarbonyl of 2 to 5 C atoms, such as methoxycarbonyl and ethoxycarbonyl, carbamoyl, N—($C_1$–$C_4$-alkyl)sulfamoyl, sulfophenylamidocarbonyl, phenylamidocarbonyl, alkylsulfonyl of 1 to 4 C atoms, phenylsulfonyl or phenoxy, and is preferably hydrogen, methyl, methoxy, chlorine, carboxy, sulfo or acetylamino, $P^9$ is hydrogen, alkyl of 1 to 4 C atoms, such as methyl, cyano, carboxy, carboalkoxy of 2 to 5 C atoms, such as carbomethoxy and carboethoxy, carbamoyl or phenyl, preferably methyl, carboxy, methoxycarbonyl, ethoxycarbonyl or phenyl and especially methyl or carboxy, T is a benzene or naphthalene ring, preferably benzene ring, $P^{10}$ is hydrogen or alkyl of 1 to 4 C atoms, such as methyl, or is phenyl or alkyl of 1 to 4 C atoms which is substituted by alkoxy of 1 to 4 C atoms, such as methoxy, or by cyano, and is preferably alkyl of 1 to 4 C atoms or phenyl, $P^{11}$ is hydrogen, chlorine, bromine, sulfo, carbamoyl, methylsulfonyl, phenylsulfonyl, cyano or sulfoalkyl of 1 to 4 C atoms, preferably hydrogen, sulfo, sulfoalkyl having an alkyl radical of 1 to 4 C atoms, such as sulfomethyl, cyano or carbamoyl, B is alkylene of 1 to 4 C atoms, methylenephenylene, ethylenephenylene, phenylenemethylene, phenyleneethylene or phenylene or is phenylene, ethylenephenylene or methylenephenylene which is substituted in the benzene radical by fluorine, chlorine, bromine, methyl, methoxy, cyano, sulfo, carboxy, acetyl, nitro, carbamoyl and/or sulfamoyl, and $D^5$ is a group of the formula (6a) or (6b)

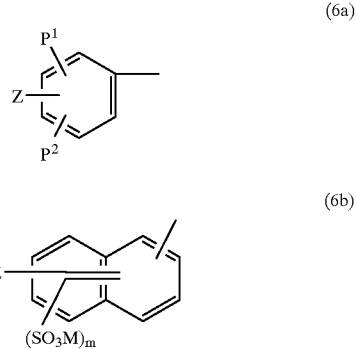

in which Z, $P^1$, $P^2$, M and m are defined as above;

K if substituted by X is 1-hydroxy-naphth-2-yl to which X is bonded, and optionally substituted by 1 or 2 sulfo groups;

$K^1$ is 1-hydroxy-naphthylene to which the azo group is bonded in 2-position and the group —N($R^x$)— is bonded in the 6-, 7- or 8-position, and that naphthylene may be substituted by 1 or 2 sulfo groups;

Hal is halogen, such as chlorine or fluorine, preferably chlorine;

L is arylene or alkylene or alkylene-arylene, each unsubstituted or substituted, wherein the alkylene moieties being preferably those of 1 to 6 carbon atoms, preferably 1 to 4 carbon atoms, in particular of 1 to 3 carbon atoms, such as methylene, ethylene and n-propylene, or preferably being of 2 to 6 carbon atoms, if interrupted by a hetero group, such as O, S, NH, $SO_2$, CO, CO—NH or NH—CO, arylene being preferably phenylene or naphthylene, the substituents of phenylene being preferably 1 or 2 substituents selected from the group consisting of alkyl of 1 to 4 carbon atoms, such as methyl and ethyl, alkoxy of 1 to 4 carbon atoms, such as methoxy and ethoxy, carboxy, sulfo and chlorine, in particular thereof methyl, ethyl, methoxy and ethoxy, and the substituents of naphthylene being preferably 1 or 2 sulfo groups, or is cycloalkylene of 5 to 8 carbon atoms optionally substituted by methyl, such as cyclohexylene or methyl-cyclohexylene, or is piperazin-N,N-ylene.

Both in the formulae mentioned above and in those below the individual formula members, both with different and with the same designation within a formula, can within the scope of their definition have meanings which are the same as or different from one another.

The groups "sulfo", "thiosulfato", "carboxy", "phosphato" and "sulfato" include both the acid form and the salt form of these groups. Accordingly, sulfo groups are groups of the formula —$SO_3M$, thiosulfato groups are groups of the formula —S—$SO_3M$, carboxy groups are groups of the formula —COOM, phosphato groups are groups of the formula —$OPO_3M_2$ and sulfato groups are groups of the formula —$OSO_3M$, in which M is hydrogen or an alkali metal, such as sodium, potassium or lithium, or the mole equivalent of an alkaline earth metal, such as of calcium, and is preferably hydrogen or an alkali metal.

Examples of the groups of the formulae (6a) and (6b) are 2-(β-sulfatoethylsulfonyl)phenyl, 3-(β-sulfatoethylsulfonyl)phenyl, 4-(β-sulfatoethylsulfonyl)phenyl, 2-carboxy-5-(β-sulfatoethylsulfonyl)phenyl, 2-chloro-3-(sulfatoethylsulfonyl)phenyl, 2-chloro-4-(β-sulfatoethylsulfonyl)phenyl, 2-bromo-4-(β-sulfatoethylsulfonyl)phenyl, 4-methoxy-3-(β-sulfatoethylsulfonyl)-phenyl, 4-chloro-3-(β-sulfatoethylsulfonyl)phenyl, 2-ethoxy-4- or -5-(β-sulfatoethylsulfonyl)phenyl, 2-methyl-4-(β-sulfatoethylsulfonyl)-phenyl, 2-methoxy-5- or -4-(β-sulfatoethylsulfonyl)phenyl, 2,4-diethoxy-5-(β-sulfato-ethylsulfonyl)phenyl, 2,4-dimethoxy-5-(β-sulfatoethylsulfonyl)phenyl, 2,5-dimethoxy-4-(β-sulfatoethylsulfonyl)phenyl, 2-methoxy-5-methyl-4-(β-sulfatoethylsulfonyl)phenyl, 2- or 3- or 4-(β-thiosulfatoethylsulfonyl)phenyl, 2-methoxy-5-(β-thiosulfatoethylsulfonyl)phenyl, 2-sulfo-4-(β-phosphatoethylsulfonyl)phenyl, 2-sulfo-4-vinylsulfonylphenyl, 2-hydroxy-4- or -5-(β-sulfatoethylsulfonyl)phenyl, 2-chloro-4- or -5-(β-chloroethylsulfonyl)phenyl, 2-hydroxy-5-(β-sulfatoethylsulfonyl)-phenyl, 2-hydroxy-3-sulfo-5-(β-sulfatoethylsulfonyl)phenyl, 3- or 4-(β-acetoxyethylsulfonyl)phenyl, 6-carboxy-1-sulfonaphth-2-yl, 5-(β-sulfato-ethylsulfonyl)naphth-2-yl, 6- or 7- or 8-(β-sulfatoethylsulfonyl)naphth-2-yl, 6-(β-sulfatoethylsulfonyl)-1-sulfo-naphth-2-yl, 5-(β- sulfatoethylsulfonyl)-1-sulfonaphth-2-yl, 8-(β-sulfatoethylsulfonyl)-6-sulfonaphth-2-yl, 4-[N-methyl-N-(β-sulfatoethylsulfonyl)]aminophenyl, 3-[N-methyl-N-(β-sulfatoethylsulfonyl)]-aminophenyl, 4-[β-(β'-sulfatoethylsulfonyl)-ethyl]phenyl, 3- or 4-[β-(β'-chloroethylsulfonyl)ethylamino]phenyl, 3- or 4-[β-(β'-sulfatoethylsulfonyl)-ethylamino]phenyl, 3- or 4-[γ-(β'-chloroethylsulfonyl)propylamino]phenyl, 3- or 4-[γ-(β'-sulfatoethylsulfonyl)propylamino]phenyl, 3- or 4-[γ-(vinylsulfonyl)-propylamino]phenyl, 4-[β-(β'-sulfatoethylsulfonyl)ethylamino]-2- or -3-sulfophenyl, 4-[β-(β'-chloroethylsulfonyl)ethylamino]-2- or -3-sulfo-phenyl, 4-[γ-(β'-sulfatoethylsulfonyl)propylamino]-2- or -3-sulfophenyl, 4-[β-(β'-chlorethylsulfonyl)propylamino]-2- or -3-sulfophenyl, 4-[γ-(β'-chloroethylsulfonyl)-ethylamino]-2-carboxy-phenyl, 4-[β-(β'-sulfatoethylsulfonyl)ethylamino]-2-carboxyphenyl, 4-[γ-(β'-chloroethylsulfonyl)propylamino]-2-carboxyphenyl and 4-[γ-(β'-sulfatoethylsulfonyl)propylamino]-2-carboxyphenyl.

The quaternary ammonium group is preferably a cyclic quaternary ammonium group or a group of the general formula (3A)

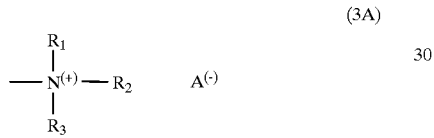
(3A)

in which

R$_1$ is alkyl of 1 to 4 carbon atoms, such as methyl and ethyl, or hydroxyalkyl of 2 to 4 carbon atoms, such as β-hydroxyethyl, R$_2$ has one of the meanings given for R$_1$, R$_3$ has one of the meanings given for R$_1$, and A$^{(-)}$ is a colorless anion, such as a hydroxyl anion, a chloride anion, a hydrogenosulfate anion, an acetate anion, a borate anion or the molar equivalent of a sulfate or mono- or dihydrogen-phosphate anion;

with the proviso that if Z is a group of the general formula (2c), (2d), (2e), (2f), (2g) or (2h), D, E or K contain a additionally a group of the formula —SO$_2$—Y defined above or Q is a group of the formula (3b) or (3c).

An example of a cyclic quaternary ammonium group represented by the formula radical X, is a group of the formula (3B)

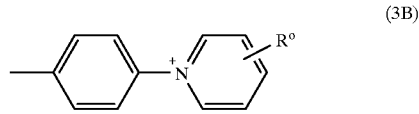
(3B)

in which R$^\circ$ is hydrogen, carboxy or carbamoyl.

Preferred groups of the formula X—D— are groups of the general formula (4a) or (4b)

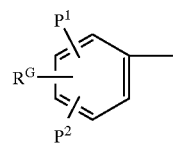
(4a)

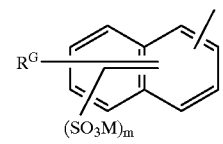
(4b)

in which

P$^1$, P$^2$, M and m are defined as above and

R$^G$ is a group of the above defined formula (3B) or preferably (3A).

A preferred embodiment of the instant invention are disazo dyes of the general formula (1b), in which one of the formula radicals D is a group of the general formula (10) and the other one is a group of the general formula (11)

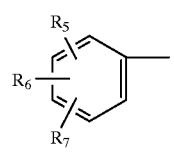
(10)

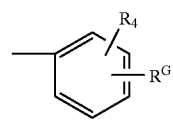
(11)

in which

R$_4$ is hydrogen, carboxy or sulfo,

R$_5$ is hydrogen, chlorine, bromine, methyl, ethyl, methoxy, ethoxy, sulfo or carboxy, R$_7$ has one of the meanings given for R$_5$, R$_6$ is a group of the general formula (2a), (2b), (2f), (2g) or (2h) or a group of the formula (2d) or (2e) wherein Q is a group of the general formula (3b) or (3c), R$^x$ is defined as above and is preferably hydrogen and R$^G$ is defined as above.

A further embodiment of the instant invention are dyes corresponding to the general formula (1a) wherein v is zero, D is substituted by X defined above and the grouping X—D— is preferably a group of the general formula (11) defined above, K is defined as above and Z is a group of the general formula (2a), (2b), (2f), (2g) or (2h) or a group of the general formula (2d) or (2e) wherein Q is a group of the general formula (3b) or (3c), and R$^x$ is defined as above and preferably hydrogen.

A further preferred embodiment of the instant invention are dyes of the general formula (12)

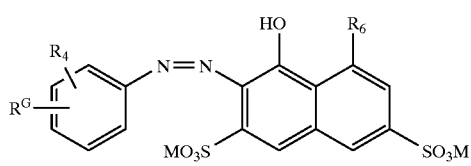

(12)

in which

R$^G$, R$_4$ and M are defined as above and

R$_6$ is a group of the general formula (2f), (2g) or (2h) or a group of the general formula (2d) or (2e) in which Q is a group of the general formula (3b) or (3c), R$^x$ being defined as above and being preferably hydrogen.

A further preferred embodiment are dyes corresponding to the general formula (1c) in which X—D$^1$— is a group of the general formula (11) defined above, K$^1$ and R$^x$ are defined as above, R$^x$ being preferably hydrogen, Hal is fluorine and preferably chlorine and L is ethylene, n-propylene, n-butylene, n-hexylene, 1,4-phenylene, 1,3-phenylene, 4-sulfo-1,3-phenylene, 3-sulfo-1,4-phenylene, 4,6-disulfo-1,3-phenylene, 5-methyl- 1,3-phenylene, 1-methoxy-2,4-phenylene, cyclohexylene, piperazin-N,N-ylene, n-butylene interrupted by NH or by oxygen or is n-propylene interrupted by oxygen.

The dyes of the invention provide improved color yield, fastness, and are environmentally advantageous in that they may be used in dyebaths with no added salt or in dyebaths with low added salt.

Quaternary ammonium compounds can be prepared by various methods. The quaternary ammonium substituent may be incorporated into an aromatic or aliphatic system by alkylation with an alkyl sulfonate (preferably methyl or ethyl sulfate) of an aromatic diamine, where one amine is protected with an acyl group such as acetyl. After the addition of the quaternary ammonium substituent, quaternization, the compound is deprotected (deacylation) and is then incorporated into the fiber-reactive dye molecule through diazotization of the free amine.

Another method of quaternization involves incorporating the quaternary ammonium group into an aromatic system by alkylation with an alkyl sulfate (preferably methyl or ethyl sulfate) of a nitroaniline. After quaternization of the amino group, the nitro substituent is reduced by catalytic hydrogenation to an amino group, which may be incorporated into the fiber-reactive dyestuff as mentioned above. In addition to the above methods, exhaustive alkylation may be achieved with an alkyl halide, e.g. methyl or ethyl iodide.

Hydroxyalkyl quaternary salts may be produced by exhaustive hydroxyalkylation of a primary amine with ethylene oxide or ethylene carbonate. It will be apparent to the skilled worker that exhaustive alkylation can be achieved with all of the above described methods by starting with the desired secondary or tertiary amine.

It will also be apparent to the skilled worker that mixed quaternary ammonium salts varying ratios can be produced by any of the above methods by reacting the amine with mixtures of desired alkylating agents, i.e. dimethyl sulfate and diethyl sulfate.

The dyes (1) are also suitable particularly for printing, especially on cotton, but also for the printing of nitrogen-containing fibers, for example wool or silk or blend fabrics comprising wool or silk.

The dyeings and prints produced with the dyes (1), especially on cellulosic fiber materials, possess high color strength and a high fiber-dye bond stability.

The Examples which follow serve to illustrate the invention. The parts are parts by weight and the percentages are percentages by weight unless stated otherwise. The relationship between parts by weight and parts by volume is that of the kilogram to the liter.

The compounds described by way of formulae in the Examples are indicated in the form of the free acid; in general they are prepared and isolated in the form of their alkali metal salts, such as lithium, sodium or potassium salts, and are used for dyeing in the form of their salts. Similarly, the starting compounds and components stated in the form of the free acid in the subsequent Examples, especially the Tabular Examples, can be employed in the synthesis as they are or in the form of their salts, preferably alkali metal salts.

EXAMPLE A

3-Aminobenzenetrimethylammonium sulfate

This compound was prepared by adding 504 parts of dimethyl sulfate to a cold, aqueous solution of 186 parts 3-aminoacetanilide hydrochloride at neutral pH. The product is deacetylated by adding 100 parts of concentrated sulfuric acid and heating at 90–100° C. for 2–4 h. An almost quantitative yield of 3-aminobenzenetrimethylammonium sulfate was obtained. The purity of the product was greater than 95% (by HPLC area).

EXAMPLE B

3-Aminobenzenetriethylammonium sulfate

This compound was obtained in a manner analogous to the above, except that diethyl sulfate replaced the dimethyl sulfate.

EXAMPLE 1

116 parts by volume of 21% 3-aminobenzenetrimethylammonium sulfate are added to aqueous hydrochloric acid and cooled to 0–10° C. 17.8 parts by weight of aqueous 38% sodium nitrite are added slowly to the amine solution. The diazotization reaction is subsequently stirred for about another 1 hour, then any excess of nitrous acid is destroyed by means of sulfamic acid. 31.9 parts of 4-hydroxy-5-amino-2,7-naphthalenedisulfonic acid are added and stirred for about 1 hour to form 4-hydroxy-5-amino-6-[4'-(β-sulfatoethylsulfonyl)-phenylazo]-naphthalene-2,7-disulfonic acid. To this dye solution, 29.8 parts of 4-(β-sulfatoethylsulfonyl)benzenediazonium salt slurry are added and the coupling reaction is carried out at 15–25° C. and pH 4.0–5.0. The dye solution is subsequently clarified and evaporated. A black powder is obtained. It has very good fiber-reactive properties and dyes cotton, for example in strong navy blue shades.

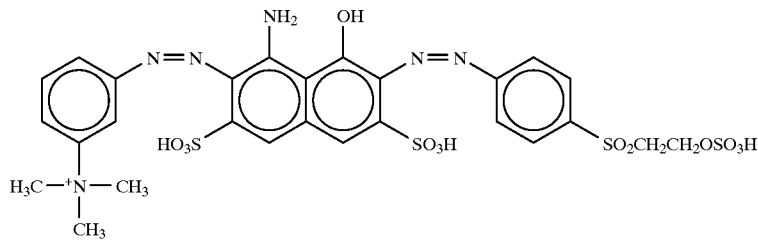

EXAMPLES 2 TO 11

Further azo dyestuffs according to the invention are described in the following tabular examples with the aid of the components corresponding to the formula (A).

|  | D—N=N—K | | (A) |
|---|---|---|---|
| Example | Radical-D | Radical-K | Color shade |
| 2 | 2-methoxy-5-(β-sulfato ethylsufonyl)phenyl- | 5-amino-4-hydroxy-6-[3-trimethylamino-phenylazo]-2,7-disulfo-napth-3-yl | greenish-tinged navy |
| 3 | 3-(β-sulfatoethyl-sulfonyl)phenyl- | 5-amino-4-hydroxy-6-[3-trimethylamino-phenylazo]-2,7-disulfo-napth-3-yl | navy blue |
| 4 | 2-methoxy-5-methyl-4-(β-sulfatoethyl-sulfonyl)phenyl- | 5-amino-4-hydroxy-6-[3-trimethylamino-phenylazo]-2,7-disulfo-napth-3-yl | greenish-tinged navy |
| 5 | 2,5-dimethoxy-4-(β-sulfatoethylsulfonyl)-phenyl- | 5-amino-4-hydroxy-6-[3-trimethylamino-phenylazo]-2,7-disulfo-napth-3-yl | greenish-tinged navy |
| 6 | 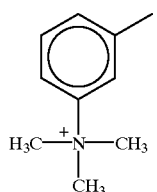 | 5-amino-4-hydroxy-6-[4-(β-sulfatoethyl-sulfonyl)phenylazo]-2,7-disulfonapth-3-yl | navy blue |
| 7 | 2-methoxy-5-(β-sulfato ethylsufonyl)phenyl- | 5-amino-4-hydroxy-6-[4-trimethylamino-phenylazo]-2,7-disulfo-napth-3-yl | greenish-tinged navy |
| 8 | 3-(β-sulfatoethyl-sulfonyl)phenyl- | 5-amino-4-hydroxy-6-[4-trimethylamino-phenylazo]-2,7-disulfo-napth-3-yl | navy blue |
| 9 | 2-methoxy-5-methyl-4-(β-sulfatoethyl-sulfonyl)phenyl- | 5-amino-4-hydroxy-6-[4-trimethylamino-phenylazo]-2,7-disulfo-napth-3-yl | greenish-tinged navy |
| 10 | 2,5-dimethoxy-4-(β sulfatoethylsulfonyl)-phenyl- | 5-amino-4-hydroxy-6-[4-trimethylamino-phenylazo]-2,7-disulfo-napth-3-yl | greenish-tinged navy |
| 11 | 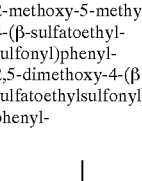 | 5-amino-4-hydroxy-6-[4-(β-sulfatoethyl-sulfonyl)phenylazo]-2,7-disulfonapth-3-yl | navy blue |

EXAMPLES 12 TO 21

Further navy blue dyestuffs are represented by the following formula (B) and are prepared analogously to the previously described method.

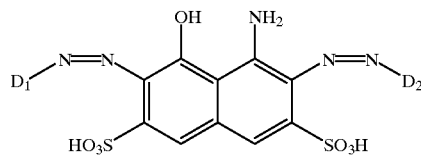
(B)
| Example | Radical-D₁ | Radical-D₂ |
| --- | --- | --- |
| 12 | 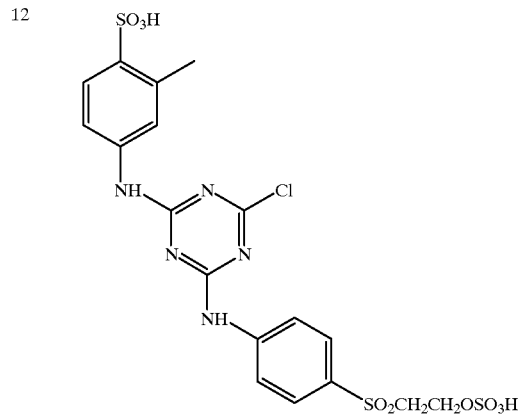 | 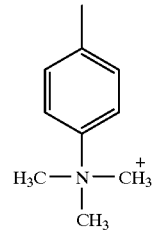 |
| 13 | 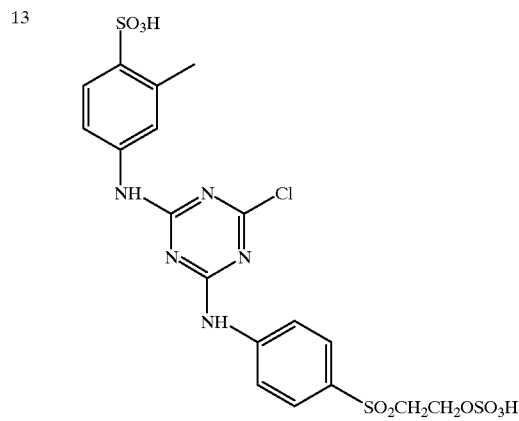 | 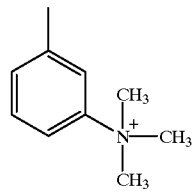 |
| 14 | 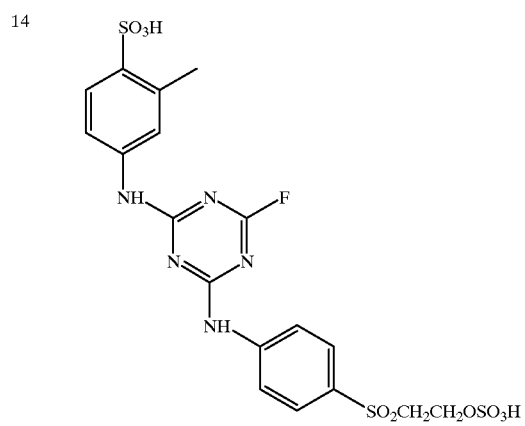 | 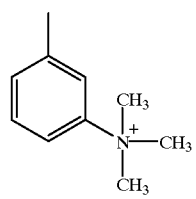 |

-continued
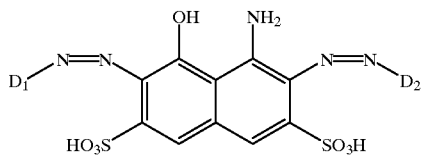
(B)
| Example | Radical-D₁ | Radical-D₂ |
| --- | --- | --- |
| 15 | 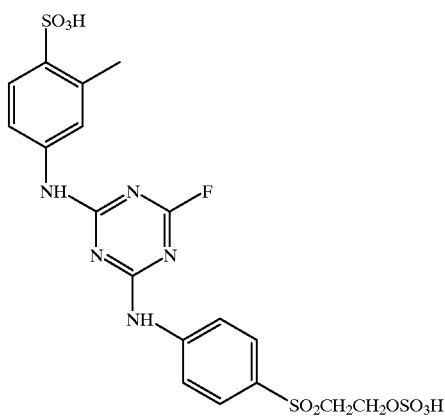 | 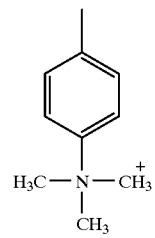 |
| 16 | 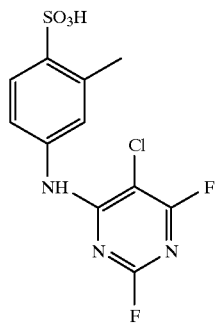 | 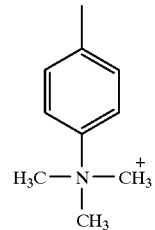 |
| 17 | 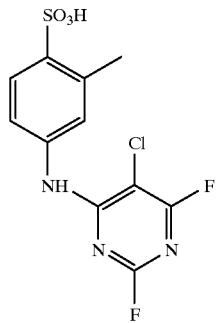 | 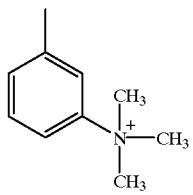 |

-continued
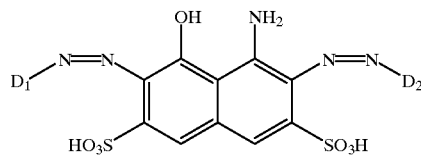
(B)
| Example | Radical-D₁ | Radical-D₂ |
|---|---|---|
| 18 | 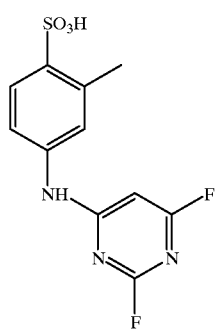 | 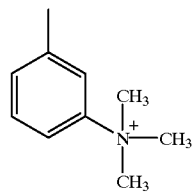 |
| 19 | 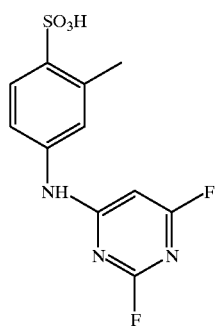 | 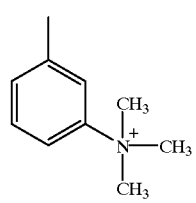 |
| 20 | 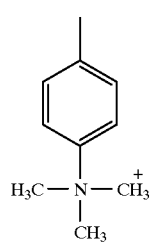 | 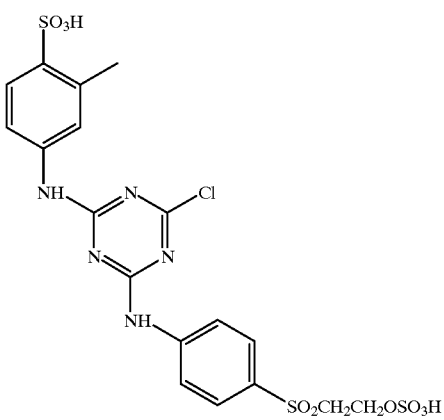 |

-continued

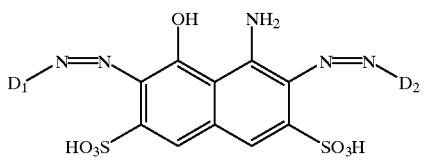

(B)

| Example | Radical-D$_1$ | Radical-D$_2$ |
|---|---|---|
| 21 | | |

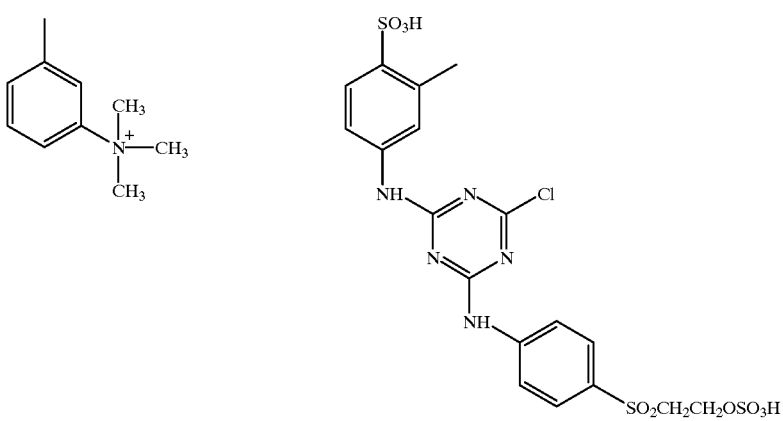

EXAMPLE 22

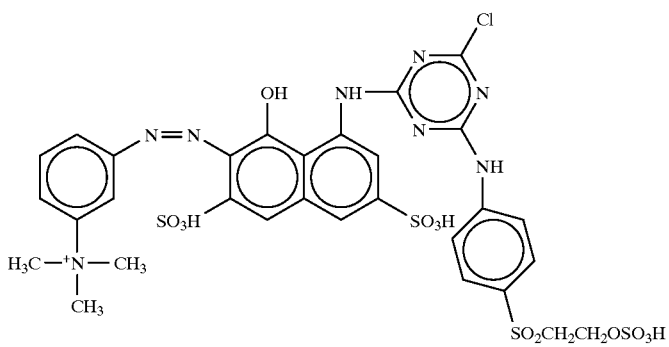

28.1 parts 1-aminobenzene-4-(2-sulfatoethyl)-sulfone is condensed with a suspension of 36.8 parts cyanuric chloride in water at 5–15° C. and pH 1.5–3.0. Then, 31.9 parts of 4-amino-5-hydroxy-2,7-naphthalenedisulfonic acid is reacted with the condensation product of the first step at 30–40° C. and pH 3.0–5.0 to form the coupling component. 116 parts by volume of 21% 3-aminobenzenetrimethylammonium sulfate are added to aqueous hydrochloric acid and cooled to 0–10° C. 17.8 parts by weight of aqueous 38% sodium nitrite are added slowly to the amine solution. The diazotization reaction is subsequently stirred for about another 1 hour, then any excess of nitrous acid is destroyed by means of sulfamic acid. The-diazonium salt is then added to the above coupling component at pH 5.0–6.0 to afford an aqueous solution of the desired dyestuff, which is further clarified and spray-dried to give a red powder. The dye has very good fiber-reactive properties and dyes cotton, for example in strong yellowish-red shades, especially under low and no-salt dyeing conditions.

EXAMPLE 23

This Example was prepared analogously to Example 22 except that 4-trimethyl-ammoniumbenzenediazonium salt replaced the 3-trimethylammoniumbenzene-diazonium salt in the coupling step. The dye has very good fiber-reactive properties and dyes cotton, for example in strong neutral red shades, especially under low and no-salt dyeing conditions.

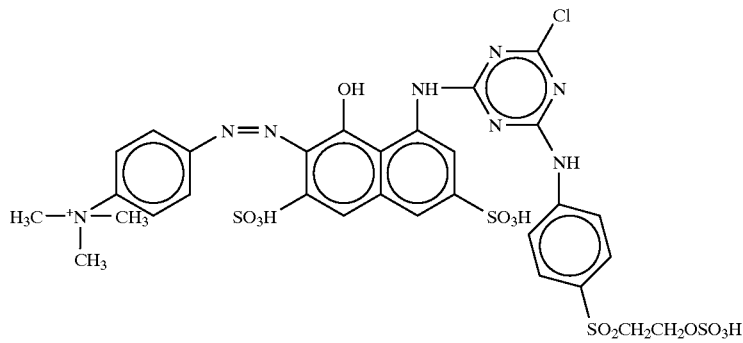

EXAMPLES 24 TO 29

Further azo dyestuffs according to the invention are described in the following tabular examples with the aid of the components corresponding to the formula (C).

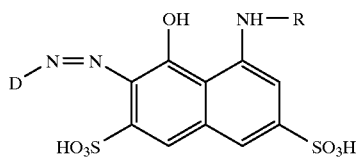

They can be prepared in the manner according to the invention, for example analogously to the above embodiment, using the components which can been seen from the particular tabular example in association with formula (C) such as a quaternary salt substituted diazo component D—$NH_2$ and a reactive component R, a halotriazine, vinylsulfone/halotriazine, etc. They have very good fiber-reactive dyestuff properties and dye the materials mentioned in the description, in particular cellulose fiber materials, such as cotton, in brilliant red shades with a very good depth of color and with very good fastness properties, especially with low and no salt dyeing conditions.

| Example | Radical-D | Radical-R |
|---|---|---|
| 24 | | |
| 25 | | |
| 26 | | |

-continued

| Example | Radical-D | Radical-R |
|---|---|---|
| 27 | 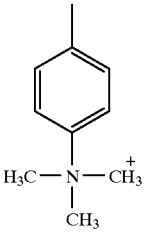 | 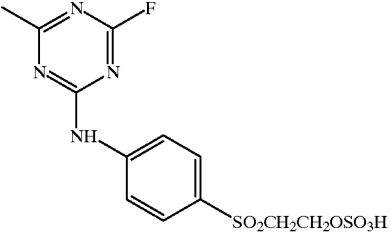 |
| 28 | 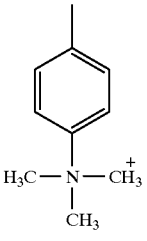 | 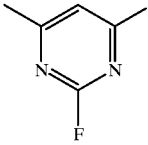 |
| 29 | 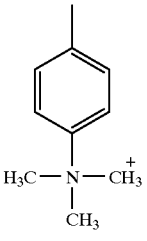 | 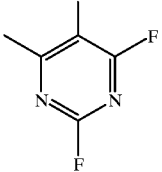 |

EXAMPLES 30 TO 37

Further azo dyestuffs according to the invention are described in the following tabular examples with the aid of the components corresponding to the formula (D).

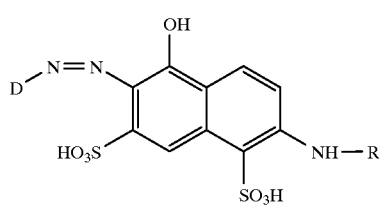
(D)

They can be prepared in the manner according to the invention, for example analogously to the above embodiment, using the components which can been seen from the particular tabular example in association with formula (D) such as a quaternary salt substituted diazo component D—$NH_2$ and a reactive component R, a halotriazine, vinylsulfone/halotriazine, etc. They have very good fiber-reactive dyestuff properties and dye the materials mentioned in the description, in particular cellulose fiber materials, such as cotton, in brilliant orange shades with a very good depth of color and with very good fastness properties, especially with low and no salt dyeing conditions.

| Example | Radical-D | Radical-R |
|---|---|---|
| 30 | 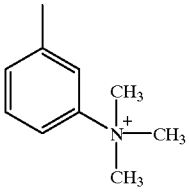 | 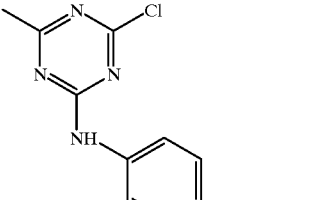 |

-continued
| Example | Radical-D | Radical-R |
|---------|-----------|-----------|
| 31 | 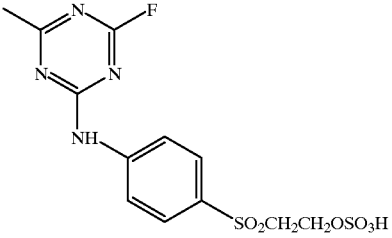 | 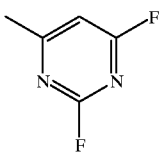 |
| 32 | | |
| 33 | | |
| 34 | 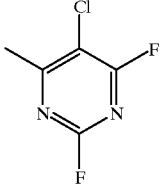 | 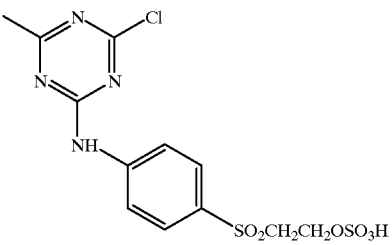 |
| 35 | | |
| 36 | 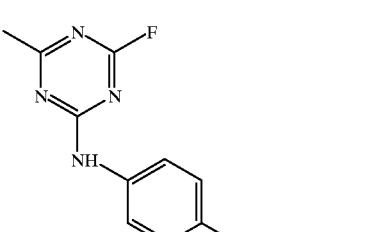 | 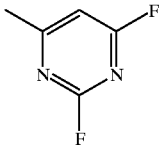 |

| Example | Radical-D | Radical-R |
|---|---|---|
| 37 | 3) | ![structure](5-chloro-6-methyl-2,4-difluoropyrimidine) |

EXAMPLE 38

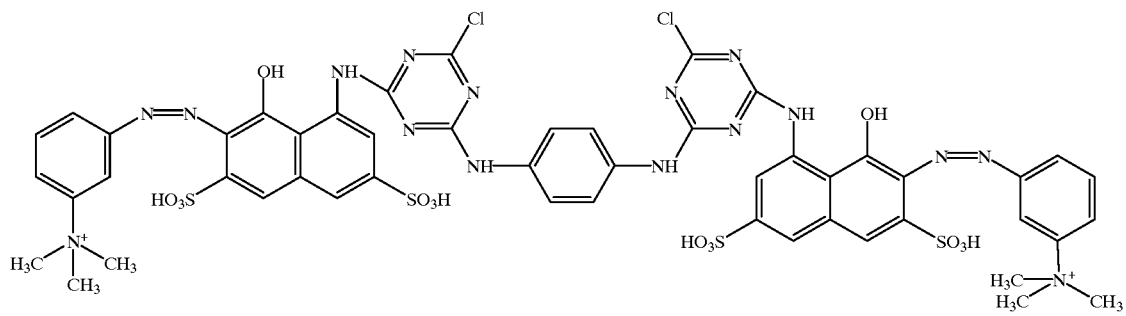

H-acid (62.8 parts) is condensed with a suspension of 36.8 parts cyanuric chloride in water at 0–10° C. and pH 1.5–3.0. 232 parts by volume of 21% 3-aminobenzene-trimethylammonium sulfate are added to aqueous hydrochloric acid and cooled to 0–10° C. 36.3 parts by weight of aqueous 38% sodium nitrite are added slowly to the amine solution. The diazotization reaction is subsequently stirred for about another 1 hour, then any excess of nitrous acid is destroyed by means of sulfamic acid. This resulting diazonium salt suspension is coupled with the above condensation product of H-acid and cyanuric chloride. The final dyestuff is obtained by condensation of 10.8 parts 1,4-phenyidiamine on the coupling product. The dyestuff is isolated by spray-drying. It has very good dyestuff properties and dyes cellulose fiber materials in clear red shades with very good fastness properties to wet processing, such as, for example, an excellent fastness to washing, as well as high resistance to steam and very good fastness to rubbing, and also very fast in respect of its bleeding onto or soiling adjacent fabric.

EXAMPLES 39 TO 41

Further azo dyestuffs according to the invention are described in the following tabular examples with the aid of the components corresponding to the formula (E).

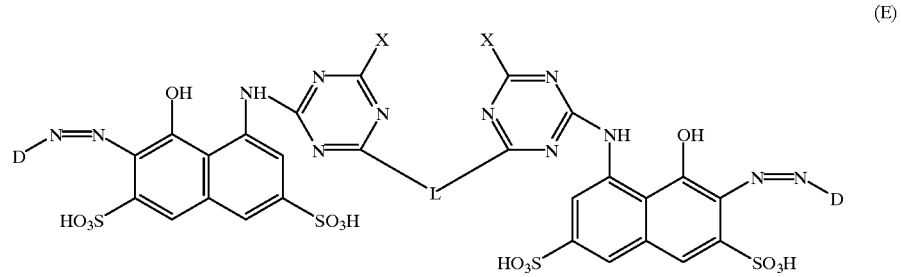

(E)

They can be prepared in the manner according to the invention, for example analogously to the above embodiment, using the components which can been seen from the particular tabular example in association with formula (E) such as a quaternary salt substituted diazo component D—NH$_2$, a reactive component X, a halotriazine, and L, a bridging group, diaminoalkane, diaminobenzene, etc. They have very good fiber-reactive dyestuff properties and dye the materials mentioned in the description, in particular cellulose fiber materials, such as cotton, in brilliant red shades with a very good depth of color and with very good fastness properties, especially with low and no salt dyeing conditions.

-continued

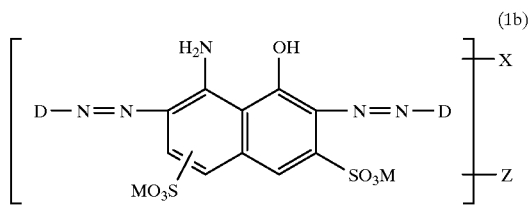
(1b)

| Example | Radical-D | Radical-R | Radical-L |
|---|---|---|---|
| 39 | 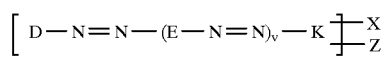 | F | —NH⁀⁀⁀NH— |
| 40 | | Cl | —HN—⟨ ⟩—NH— |
| 41 | | F | —NH⁀⁀⁀NH— |

We claim:

1. Fiber reactive azo dye having a quaternary ammonium group as a permanent substituent and a fiber reactive group, being selected from the dyes of the general formulae (1a), (1b) and (1c)

$$\left[ D-N=N-(E-N=N)_v-K \genfrac{}{}{0pt}{}{-X}{-Z} \right] \quad (1a)$$

-continued

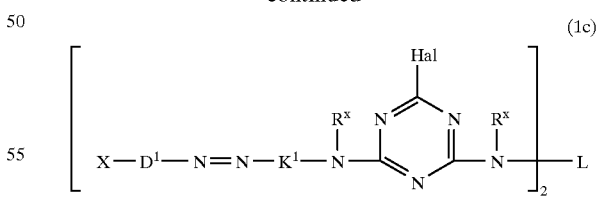
(1c)

in which:

v is 0,

X is a grouping containing a quaternary ammonium group,

Z is a fiber reactive group selected from the groups of the formulae (2a), (2b), (2d), (2e), (2f), (2g) and (2n)

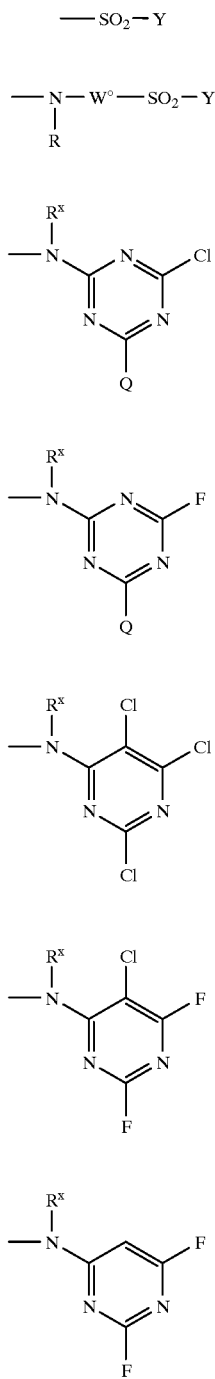

(2a) —SO$_2$—Y (2b) —N(R)—W°—SO$_2$—Y (2d) [triazine with R$^x$–N–, Cl, Q]

(2e) [triazine with R$^x$–N–, F, Q]

(2f) [pyrimidine with R$^x$–N–, Cl, Cl, Cl]

(2g) [pyrimidine with R$^x$–N–, Cl, F, F]

(2h) [pyrimidine with R$^x$–N–, F, F]

Y is vinyl, or ethyl substituted in the β-position by a substituent which is eliminated by the action of an alkaline agent, R is alkyl of 1 to 4 carbon atoms, or hydrogen, W° is alkylene of 2 to 4 carbon atoms, or a covalent bond, R$^x$ is hydrogen, alkyl of 1 to 4 carbon atoms, unsubstituted or substituted by halogen, hydroxy, sulfo, sulfato, carboxy, sulfamoyl, alkoxycarbonyl of 2 to 5 carbon atoms or alkoxy of 1 to 4 carbon atoms, and Q is a group of the general formula (3b) or (3c)

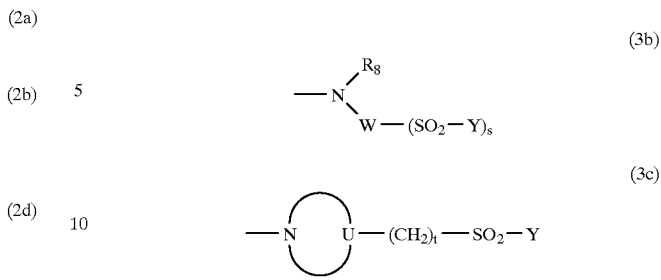

in which

R$_8$ is hydrogen, alkyl of 1 to 4 carbon atoms, cyclohexyl, alkoxy of 1 to 4 carbon atoms, hydroxyalkyl of 2 to 4 carbon atoms, sulfoalkyl of 1 to 4 carbon atoms, phenyl unsubstituted or substituted by 1 to 2 substituents selected from the group of substituents consisting of chlorine, bromine, methyl, ethyl, methoxy, sulfo and carboxy, or is monosulfonaphthyl, disulfonaphthyl, alkyl of 2 to 6 carbon atoms substituted by phenyl, the alkyl moiety may be interrupted by a hetero group selected from the group consisting of O, S, NH, SO$_2$, CO, CO—NH and NH—CO, and the phenyl substituent thereof may be substituted by 1 or 2 substituents selected from the group consisting of chlorine, bromine, methyl, ethyl, methoxy, ethoxy, sulfo and carboxy, W is arylene, alkylene or alkylene-arylene, each unsubstituted or substituted, wherein the alkylene moieties being those of 1 to 6 carbon atoms or of 2 to 6 carbon atoms if interrupted by a hetero group selected from group consisting of O, S, NH, SO$_2$, CO, CO—NH and NH—CO, arylene being phenylene or naphthylene, the substituents of phenylene being 1 or 2 substituents selected from the group consisting of alkyl of 1 to 4 carbon atoms, alkoxy of 1 to 4 carbon atoms, carboxy, sulfo, and chlorine and the substituents of naphthylene being 1 or 2 sulfo groups, Y is defined as above, s is the number 1 or 2, t is 1, 2 or 3, and U is N or CH, and U forms together with the N-atom a bivalent ring consisting of 1 or 2 alkyl groups having 1 to 5 carbon atoms and optionally additionally 1 or 2 hetero groups;

X being bonded to D and Z being bonded to K respectively X being bonded to K and Z being bonded to D in formula (1a), and X is bonded to one of the two D's and Z is bonded to the other D in formula (1b);

D if substituted by X has the meaning of D$^1$ defined below;

D if substituted by Z, is phenylene unsubstituted or substituted by 1 or 2 substituents selected from alkyl of 1 to 4 carbon atoms, alkoxy of 1 to 4 carbon atoms and sulfo, or is naphthylene, substituted by 1 or 2 sulfo groups;

D$^1$ is phenylene unsubstituted or substituted by 1 or 2 substituents selected from alkyl of 1 to 4 carbon atoms, alkoxy of 1 to 4 carbon atoms, alkanoyl of 2 to 5 carbon atoms, cyano, sulfo, carboxy, alkoxycarbonyl of 2 to 5 carbon atoms, carbamoyl, N—(C$_1$–C$_4$-alkyl)-carbamoyl, fluorine, chlorine, bromine, trifluoromethyl, nitro, sulfamoyl, N—(C$_1$–C$_4$-alkyl)- sulfamoyl, sulfophenylamidocarbonyl, phenylamidocarbonyl, alkylksulfonyl of 1 to 4 carbon atoms, phenylsulfonyl, phenoxy and hydroxy, or is naphthylene unsubstituted or substituted by 1 or 2 sulfo groups;

E is a group of the general formula (7a), (7b) or (7c)

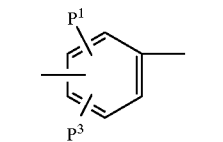
(7a)

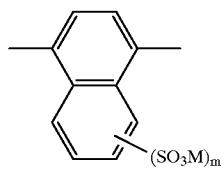
(7b)

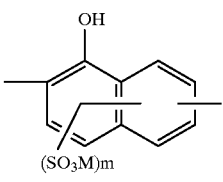
(7c)

in which

M is hydrogen or an alkali metal, m is zero, 1 or 2 (and if m is zero, this group is a hydrogen), $P^1$ is hydrogen, methyl, ethyl, methoxy, ethoxy, alkanoyl of 2 to 5 carbon atoms, cyano, sulfo, carboxy, alkoxycarbonyl of 2 to 5 carbon atoms, carbamoyl, N—($C_1$–$C_4$-alkyl)-carbamoyl, fluorine, chlorine, bromine or trifluoromethyl, and $P^3$ is hydrogen, alkyl of 1 to 4 C atoms, alkoxy of 1 to 4 C atoms, chlorine, alkanoylamino of 2 to 5 atoms, benzoylamino, ureido, phenylureido, alkylureido having 1 to 4 C atoms in the alkyl radical, phenylsulfonyl or alkylsulfonyl of 1 to 4 atoms;

—K—Z— is a group of the general formula (9a), (9b), (9c), (9d), (9e), (9f), (9g) or (9h)

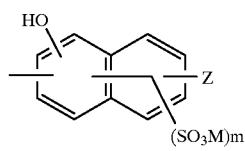
(9a)

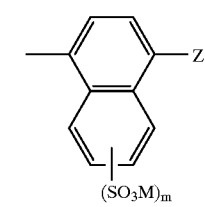
(9b)

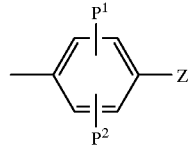
(9c)

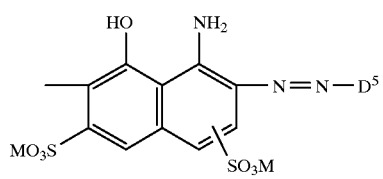
(9d)

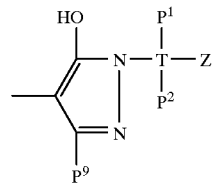
(9e)

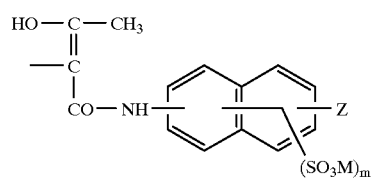
(9f)

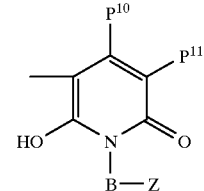
(9g)

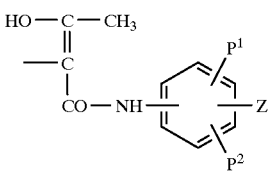
(9h)

in which

Z, M, m and $P^1$ are defined as above, $P^2$ is hydrogen, methyl, ethyl, methoxy, ethoxy, cyano, nitro, carboxy, sulfo, chlorine, alkanoylamino of 2 to 5 C atoms, alkoxycarbonyl of 2 to 5 C atoms, carbamoyl, N—($C_1$–$C_4$-alkyl)sulfamoyl, sulfophenylamidocarbonyl, phenylamidocarbonyl), alkylsulfonyl of 1 to 4 C atoms, phenylsulfonyl or phenoxy, $P^9$ is hydrogen, alkyl of 1 to 4 C atoms, cyano, carboxy, carboalkoxy of 2 to 5 C atoms, carbamoyl or phenyl, T is a benzene or naphthalene ring, $P^{10}$ is hydrogen or alkyl of 1 to 4 C atoms, or is phenyl or alkyl of 1 to 4 C atoms which is substituted by alkoxy of 1 to 4 C atoms or by cyano, $P^{11}$ is hydrogen, chlorine, bromine, sulfo, carbamoyl, methylsulfonyl, phenylsulfonyl, cyano or sulfoalkyl of 1 to 4 C atoms, B is alkylene of 1 to 4 C atoms, methylenephenylene, ethylenephenylene, phenylenemethylene, phenyleneethylene or phenylene or is phenylene, ethylenephenylene or methylenephenylene which is substituted in the benzene radical by substituents selected from the group consisting of fluorine, chlorine, bromine, methyl, methoxy, cyano, sulfo, carboxy, acetyl, nitro, carbamoyl and sulfamoyl, and $D^5$ is a group of the formula (6a) or (6b)

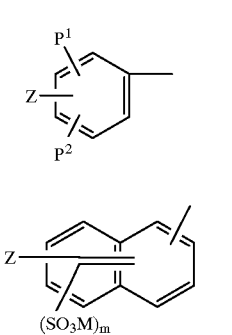

in which Z, $P^1$, $P^2$, M and m are defined as above;

K if substituted by X is 1-hydroxy-naphth-2-yl to which X is bonded, and optionally substituted by 1 or 2 sulfo groups;

$K^1$ is 1-hydroxy-naphthylene to which the azo group is bonded in 2-position and the group —N($R^x$)— is bonded in the 6-, 7- or 8-position, and that naphthylene is optionally substituted by 1 or 2 sulfo groups;

Hal is halogen;

L is arylene or alkylene or alkylene-arylene, each unsubstituted or substituted, and the alkylene moieties optionally being interrupted by a hetero group, and wherein the substituents are selected from the group consisting of alkyl of 1 to 4 carbon atoms, alkoxy of 1 to 4 carbon atoms, carboxy, sulfo and chlorine or is cycloalkylene of 5 to 8 carbon atoms optionally substituted by methyl or is piperazin-N,N-ylene.

2. A dye as claimed in claim 1, wherein the quaternary ammonium group is a cyclic quaternary ammonium group or a group of the general formula (3A)

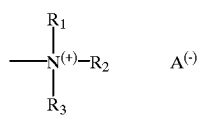

in which $R_1$ is alkyl of 1 to 4 carbon atoms, or hydroxyalkyl of 2 to 4 carbon atoms, $R_2$ has one of the meanings given for $R_1$, $R_3$ has one of the meanings given for $R_1$, and $A^{(-)}$ is a colorless anion, with the proviso that if Z is a group of the general formula (2f) or (2h), D, E or K contain additionally a group of the formula —$SO_2$—Y defined in claim 1.

3. A dye as claimed in claim 1, corresponding to the general formula (1b), in which one of the formula radicals D is a group of the general formula (10) and the other one is a group of the general formula (11)

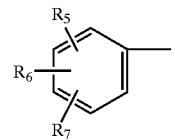

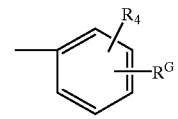

in which $R_4$ is hydrogen, carboxy or sulfo, $R_5$ is hydrogen, chlorine, bromine, methyl, ethyl, methoxy, ethoxy, sulfo or carboxy, $R_7$ has one of the meanings given for $R_5$, $R_6$ is a group of the general formula (2a), (2b), (2f), (2g) or (2h) or a group of the formula (2d) or (2e) wherein Q is a group of the general formula (3b) or (3c), and $R^G$ is a group of the formula (3A)

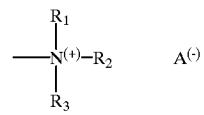

in which $R_1$ is alkyl of 1 to 4 carbon atoms, or hydroxyalkyl of 2 to 4 carbon atoms, $R_2$ has one of the meanings given for $R_1$, $R_3$ has one of the meanings given for $R_1$, and $A^{(-)}$ is a colorless anion.

4. A dye as claimed in claim 1, corresponding to the general formula (1a) wherein v is zero, D is substituted by X defined in claim 1 and the grouping X—D— is a group of the general formula (11)

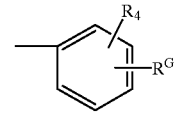

in which $R_4$ is hydrogen, carboxy or sulfo, and $R^G$ is a group of the formula (3A)

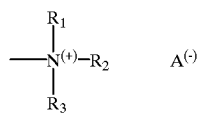
(3A)

in which $R_1$ is alkyl of 1 to 4 carbon atoms, or hydroxyalkyl of 2 to 4 carbon atoms, $R_2$ has one of the meanings given for $R_1$, $R_3$ has one of the meanings given for $R_1$, and $A^{(-)}$ is a colorless anion.

5. A dye as claimed in claim 1, corresponding to the general formula (12)

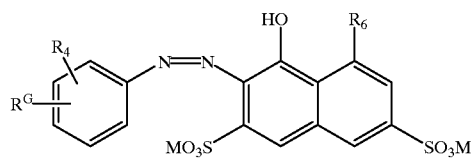
(12)

in which

M is defined as in claim 1, $R_4$ is hydrogen, carboxy or sulfo, $R^G$ is a group of the formula (3A)

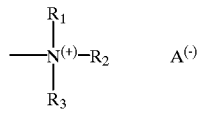
(3A)

in which $R_1$ is alkyl of 1 to 4 carbon atoms, or hydroxyalkyl of 2 to 4 carbon atoms, $R_2$ has one of the meanings given for $R_1$, $R_3$ has one of the meanings given for $R_1$, and $A^{(-)}$ is a colorless anion and $R_6$ is a group of the general formula (2f), (2g) or (2h) or a group of the general formula (2d) or (2e) in which Q is a group of the general formula (3b) or (3c).

6. A dye as claimed in claim 1, corresponding to the general formula (1c) in which $X-D^1-$ is a group of the general formula (11)

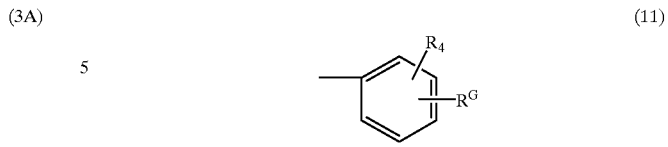
(11)

in which $R_4$ is hydrogen, carboxy or sulfo, $R^G$ is a group of the formula (3A)

(3A)

in which $R_1$ is alkyl of 1 to 4 carbon atoms, or hydroxyalkyl of 2 to 4 carbon atoms, $R_2$ has one of the meanings given for $R_1$, $R_3$ has one of the meanings given for $R_1$, and $A^{(-)}$ is a colorless anion, $K^1$ and $R^x$ are defined as in claim 1, Hal is fluorine or chlorine and L is ethylene, n-propylene, n-butylene, n-hexylene, 1,4-phenylene, 1,3-phenylene, 4-sulfo-1,3-phenylene, 3-sulfo-1,4-phenylene, 4,6-disulfo- 1,3-phenylene, 5-methyl- 1,3-phenylene, 1-methoxy-2,4-phenylene, cyclohexylene, piperazin-N,N-ylene, n-butylene interrupted by NH or by oxygen or is n-propylene interrupted by oxygen.

7. The dye of claim 2, wherein $R_1$, $R_2$ and $R_3$ are each, independently of one another, methyl or ethyl.

8. The fiber reactive azo dye as claimed in claim 1, wherein R is methyl or ethyl.

9. The fiber reactive azo dye as claimed in claim 1, wherein $W^o$ is ethylene or n-propylene.

10. The fiber reactive azo dye as claimed in claim 1, wherein W is an alkylene moiety having from 1 to 6 carbon atoms.

11. The fiber reactive azo dye as claimed in claim 1, wherein W is an alkylene moiety having from 2 to 6 carbon atoms.

12. The fiber reactive azo dye as claimed in claim 1, wherein L is arylene or alkylene or alkylene-arylene, each unsubstituted or substituted, wherein the alkylene moieties being is interrupted by a hetero group selected from the group consisting of O, S, NH, $SO_2$, CO, CO—NH and NH—CO, arylene being phenylene or naphthylene, the substituents of phenylene being 1 or 2 substituents selected from the group consisting of alkyl of 1 to 4 carbon atoms, alkoxy of 1 to 4 carbon atoms, carboxy, sulfo and chlorine and the substituents of naphthylene being 1 or 2 sulfo groups, or is cycloalkylene of 5 to 8 carbon atoms optionally substituted by methyl or is piperazin-N,N-ylene.

* * * * *